(12) United States Patent
Zhao et al.

(10) Patent No.: US 11,314,557 B2
(45) Date of Patent: Apr. 26, 2022

(54) METHOD, APPARATUS, AND COMPUTER PROGRAM PRODUCT FOR SELECTING COMPUTING RESOURCES FOR PROCESSING COMPUTING TASK BASED ON PROCESSING PERFORMANCE

(71) Applicant: EMC IP Holding Company LLC, Hopkinton, MA (US)

(72) Inventors: Junping Zhao, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 106 days.

(21) Appl. No.: 16/399,625

(22) Filed: Apr. 30, 2019

(65) Prior Publication Data

US 2019/0384646 A1     Dec. 19, 2019

(30) Foreign Application Priority Data

Jun. 15, 2018  (CN) .......................... 201810621213.4

(51) Int. Cl.
*G06F 9/50* (2006.01)
*G06F 9/38* (2018.01)
*G06F 9/48* (2006.01)

(52) U.S. Cl.
CPC .......... *G06F 9/5077* (2013.01); *G06F 9/3877* (2013.01); *G06F 9/4887* (2013.01); *G06F 9/5027* (2013.01)

(58) Field of Classification Search
None
See application file for complete search history.

(56) References Cited

U.S. PATENT DOCUMENTS

| | | | | |
|---|---|---|---|---|
| 9,930,648 | B2 * | 3/2018 | Frenne | H04L 5/0053 |
| 2002/0161902 | A1 * | 10/2002 | McMahan | G06F 9/5011 709/229 |
| 2008/0134191 | A1 * | 6/2008 | Warrier | G06F 9/5077 718/104 |
| 2008/0244607 | A1 * | 10/2008 | Rysin | G06Q 30/06 718/104 |
| 2016/0218990 | A1 * | 7/2016 | Diaz | H04L 41/5019 |
| 2017/0214738 | A1 * | 7/2017 | Agarwal | H04L 47/125 |
| 2017/0366448 | A1 * | 12/2017 | Hei | H04L 67/2842 |
| 2018/0357099 | A1 * | 12/2018 | Browne | G06F 9/5055 |
| 2019/0018698 | A1 * | 1/2019 | Wang | G06F 9/45558 |
| 2019/0205747 | A1 * | 7/2019 | Srivastava | G06N 3/0445 |
| 2019/0253134 | A1 * | 8/2019 | Coleman | H04B 7/18513 |

* cited by examiner

*Primary Examiner* — Meng Ai T An
*Assistant Examiner* — Zujia Xu
(74) *Attorney, Agent, or Firm* — Ryan, Mason & Lewis, LLP

(57) ABSTRACT

A method for processing a computing task comprises: dividing multiple computing resources into multiple groups on the basis of topology information describing a connection relationship between the multiple computing resources; selecting at least one computing resource from at least one group of the multiple groups; determining processing performance of processing the computing task with the selected at least one computing resource; and allocating the at least one computing resource on the basis of the processing performance to process the computing task. Accordingly, the multiple computing resources can be utilized sufficiently, so that the computing task can be processed with better processing performance.

20 Claims, 9 Drawing Sheets

|  | COMPUTING RESOURCE 160-1 | COMPUTING RESOURCE 160-2 | COMPUTING RESOURCE 160-3 | COMPUTING RESOURCE 160-4 |
|---|---|---|---|---|
| COMPUTING RESOURCE 160-1 | 0 | 2 | 5 | 5 |
| COMPUTING RESOURCE 160-2 | 2 | 0 | 5 | 5 |
| COMPUTING RESOURCE 160-3 | 5 | 5 | 0 | 2 |
| COMPUTING RESOURCE 160-4 | 5 | 5 | 2 | 0 |

610A

FIRST GROUP — 620A
COMPUTING RESOURCE 160-1
COMPUTING RESOURCE 160-2

COMPUTING RESOURCE — 622A
COMPUTING RESOURCE 160-3
COMPUTING RESOURCE 160-4

|  | COMPUTING RESOURCE 160-1 | COMPUTING RESOURCE 160-2 | COMPUTING RESOURCE 160-3 | COMPUTING RESOURCE 160-4 |
|---|---|---|---|---|
| COMPUTING RESOURCE 160-1 | 0 | 1 | 1 | 0.5 |
| COMPUTING RESOURCE 160-2 | 1 | 0 | 0.5 | 1 |
| COMPUTING RESOURCE 160-3 | 0.5 | 1 | 0 | 1 |
| COMPUTING RESOURCE 160-4 | 1 | 1 | 1 | 0 |

610B

FIRST GROUP — 620B
COMPUTING RESOURCE 160-1
COMPUTING RESOURCE 160-4

COMPUTING RESOURCE — 622B
COMPUTING RESOURCE 160-2
COMPUTING RESOURCE 160-3

US 11,314,557 B2

METHOD, APPARATUS, AND COMPUTER PROGRAM PRODUCT FOR SELECTING COMPUTING RESOURCES FOR PROCESSING COMPUTING TASK BASED ON PROCESSING PERFORMANCE

RELATED APPLICATION(S)

The present application claims priority to Chinese Patent Application No. 201810621213.4, filed Jun. 15, 2018, and entitled "Method, Apparatus, and Computer Program Product for Processing Computing Task," which is incorporated by reference herein in its entirety.

FIELD

Embodiments of the present disclosure generally relate to a computing system including dedicated computing resources, and more specifically, to a method, an apparatus and a computer program product for processing a computing task by using a dedicated computing resource in the computing system.

BACKGROUND

Applications on the client can be designed to complete various processing or analyzing tasks such as processing and storage resources by using computing resources. As the requirement and complexity of the tasks such as machine learning, deep learning, and data mining continuously grow, a large amount of and/or variable computing resources are required to satisfy operations of the corresponding application. This can be fulfilled by a machine or system having multiple dedicated computing resources, where the application can be scheduled to operate on one or more dedicated computing resources of the machine or system. For example, a cloud-based computing system has already been developed, and this computing system includes a machine having one or more dedicated computing resources. Different clients can rent computing resources (for example, dedicated computing resources) of the system as required to operate their own applications.

With the development of computer technologies, there is an increasing variety of computing resources, and computing resources are no longer limited to traditional ones like central processing units. For example, currently the computing capability of the graphics processing units (GPUs) has increased significantly. GPUs are particularly suitable to execute computing tasks in deep learning, high performance computing, machine learning and so on by virtue of their distinctive properties. However, for ordinary client devices and conventional cloud computing devices, their graphic processing units are rather limited in performance and lack a high performance processing capability. At this point, the question of how to process a computing task using the computing capability of a graphic processing unit of another device (e.g., remotely) has become a focus of research.

However, some existing technical solutions fail to effectively determine which remote computing resource(s) (e.g., computing resource(s) in a computing resource pool) will be selected for processing a computing task. Therefore, it is desirable to provide a technical solution for easily and effectively processing a computing task using multiple computing resources in the resource pool.

SUMMARY

Embodiments of the present disclosure provide a method, a device and a corresponding computer program product for processing a computing task.

According to a first aspect of the present disclosure, there is provided a method for processing a computing task. The method comprises: dividing multiple computing resources into multiple groups on the basis of topology information describing a connection relationship between the multiple computing resources; selecting at least one computing resource from at least one group of the multiple groups; determining processing performance of processing the computing task with the selected at least one computing resource; and allocating the at least one computing resource on the basis of the processing performance to process the computing task.

According to a second aspect of the present disclosure, there is provided an apparatus for processing a computing task, comprising: at least one processor; a volatile memory; and a memory coupled to the at least one processor, the memory having instructions stored thereon, the instructions, when executed by the at least one processor, causing the apparatus to perform acts. The acts include: dividing multiple computing resources into multiple groups on the basis of topology information describing a connection relationship between the multiple computing resources; selecting at least one computing resource from at least one group of the multiple groups; determining processing performance of processing the computing task with the selected at least one computing resource; and allocating the at least one computing resource on the basis of the processing performance to process the computing task.

According to a third aspect of the present disclosure, there is provided a computer program product. The computer program product is tangibly stored on a computer readable medium and comprises machine executable instructions which, when executed, cause the machine to implement a method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

FIG. 6A schematically shows a block diagram for dividing multiple computing resources connected according to the topology structure shown in FIG. 5A into different groups according to example embodiments of the present disclosure, and FIG. 6B schematically shows a block diagram for dividing multiple computing resources connected according to the topology structure shown in FIG. 5B into different groups according to example embodiments of the present disclosure;

DETAILED DESCRIPTION

Preferred embodiments of the present disclosure will be described in more detail with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can comprise other explicit and implicit definitions.

As described above, dedicated computing resources can be provided locally at the client or by a remote machine or system. In some examples, a cloud-based computing system may be deployed, which includes a plurality of machines having one or more dedicated computing resources. The dedicated computing resources of the computing system can be utilized by different clients based on their needs to dispatch the corresponding applications to operate on available dedicated computing resources.

Figure 1:
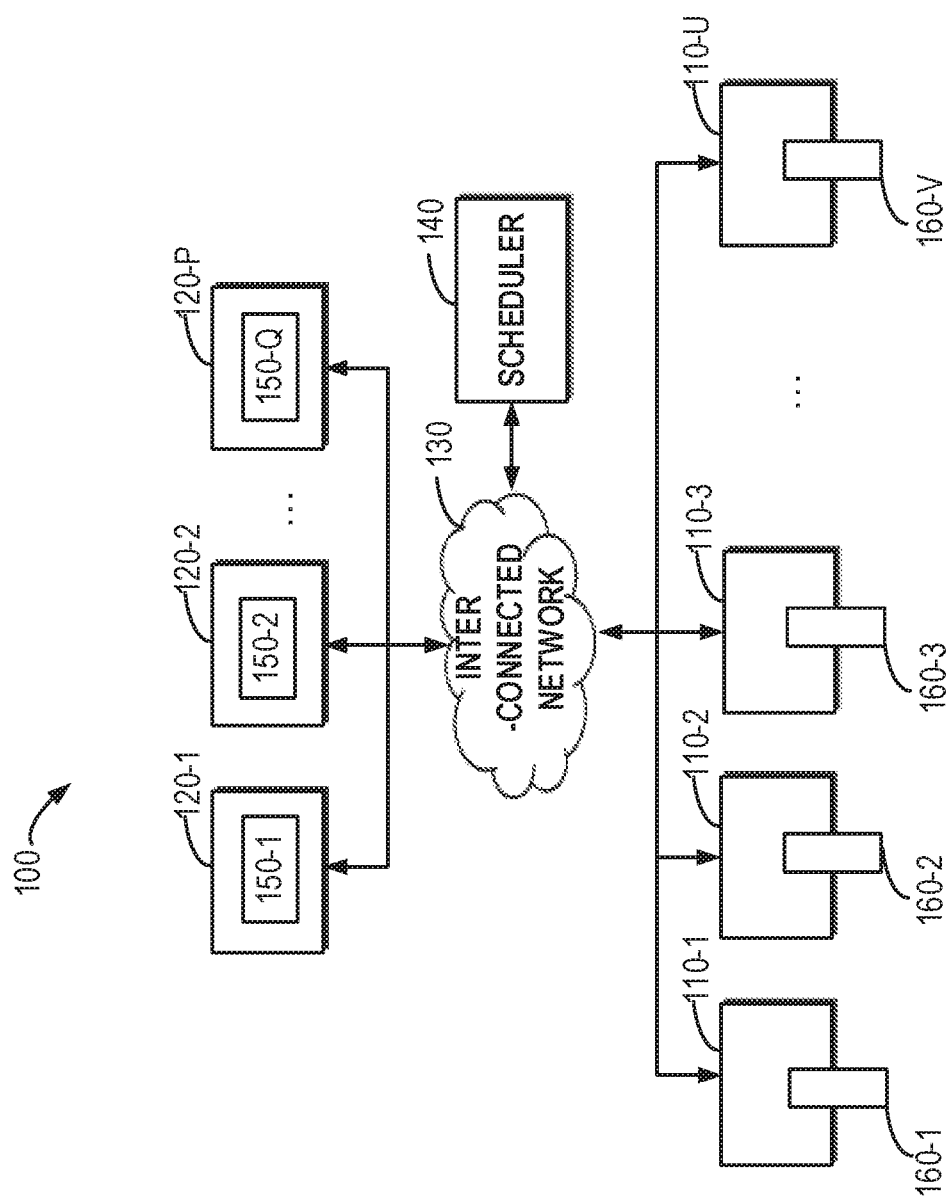
FIG. 1 schematically shows a block diagram of an example computing system in which some embodiments of the present disclosure can be implemented.

FIG. 1 is a schematic diagram illustrating an example computing system 100 in which embodiments of the present disclosure can be implemented. A plurality of servers for running applications, including a server 110-1, a server 110-2, a server 110-3, ..., a server 110-U (hereinafter collectively or individually referred to as a server 110, wherein U is a natural number greater than 1), are deployed in the computing system 100. The computing system 100 further includes a dedicated computing resource 160-1, a dedicated computing resource 160-2, a dedicated computing resource 160-3, ..., and a dedicated computing resource 160-V (hereinafter collectively or individually referred to as a dedicated computing resource 160, wherein V is a natural number greater than 1). Each server 110 has one or more dedicated computing resources 160.

In the example of FIG. 1, the server 110-1 has the dedicated computing resource 160-1, the server 110-2 has the dedicated computing resource 160-2, the server 110-3 has the dedicated computing resource 160-3, and the server 110-U has the dedicated computing resource 160-V. It will be understood that each server is not limited to have only one computing resource, but one server may have one or more computing resources. Therefore, here the value of U may not equal that of V.

In the context of the present disclosure, examples of the dedicated computing resource 160 may include, but are not limited to, a GPU, a Field Programmable Gate Array (FPGA), or the like. For the sake of discussion, some embodiments will use GPU as the example of the dedicated computing resources. In addition to the dedicated computing resource 160, the server 110 may further include, for example, one or more general processing units such as a central processing unit or CPU (not shown).

FIG. 1 further illustrates a plurality of clients 120-1, 120-2, ..., 120-P (hereinafter collectively or individually referred to as a client 120, wherein P is a natural number greater than 1) respectively having applications 150-1, 150-2, ..., 150-Q (hereinafter collectively or individually referred to as an application 150, wherein Q is a natural number greater than 1) to run. The application 150 may be any application running on the machine, and the application can be designed to perform corresponding data processing or analyzing tasks. As an example, the application 150 can perform data processing or analyzing tasks associated with a neural network. It will be appreciated that each client is not limited to have only one application, but one client may have one or more applications. Therefore, here the value of P may not equal that of Q.

To quickly and efficiently run these applications and/or save local computing resources, the client 120 may request the dedicated computing resource 160 of the server 110 to run these applications 150. In such an embodiment, the client 120 may be connected via an interconnected network 130 to one or more servers 110 and hand over the application 150 to run by one or more dedicated computing resources 160 of the server 110. The interconnected network 130 can support different types of wired or wireless connections based on various network transmission techniques, for example, remote direct memory access (RDMA), transmission control protocol (TCP) or the like, depending on interfaces supported by the client 120, the server 110 and/or the dedicated computing resource 160.

It should be understood that the device and/or arrangement as shown in FIG. 1 is provided as an example only. In other examples, the computing system 100 can include any suitable number of servers 110 and clients 120. Each server 110 can be mounted with any suitable number of dedicated computing resources 160 and each client 120 can have a plurality of applications 150 to run. In addition, a scheduler 140, although separately shown, can be implemented by other devices independent of the server 110 in the practical application, or can be implemented at least in part on one or more servers 110.

To describe in a clear and concise manner, example embodiments of the present disclosure will be described in detail by mainly using the GPU kernel as an example. It is known that a GPU, as a dedicated processor, has strong computing capability due to a large number of kernels and high-bandwidth memory. In the GPU hardware architecture, one GPU usually has a large number of GPU kernels, such as 5120 or up to 10000 kernels. The GPU kernel, as a dedicated computing resource, is the most basic processing unit, which is also known as a stream processor (SP). Instructions and tasks are eventually processed on the GPU kernel. A plurality of GPU kernels simultaneously execute instructions to implement parallel computing of the GPU. A plurality of SPs, in addition to other resources such as register and shared memory, can compose one stream multiprocessor (SM).

However, it should be understood that a GPU is only an example dedicated computing resource, and shall not limit the scope of the present disclosure. Spirits and principles described herein can be applied to other dedicated computing resources, for example computing resources in an accelerator such as an FPGA currently known or to be developed in the future, without limiting to the GPU kernel only.

Figure 2:
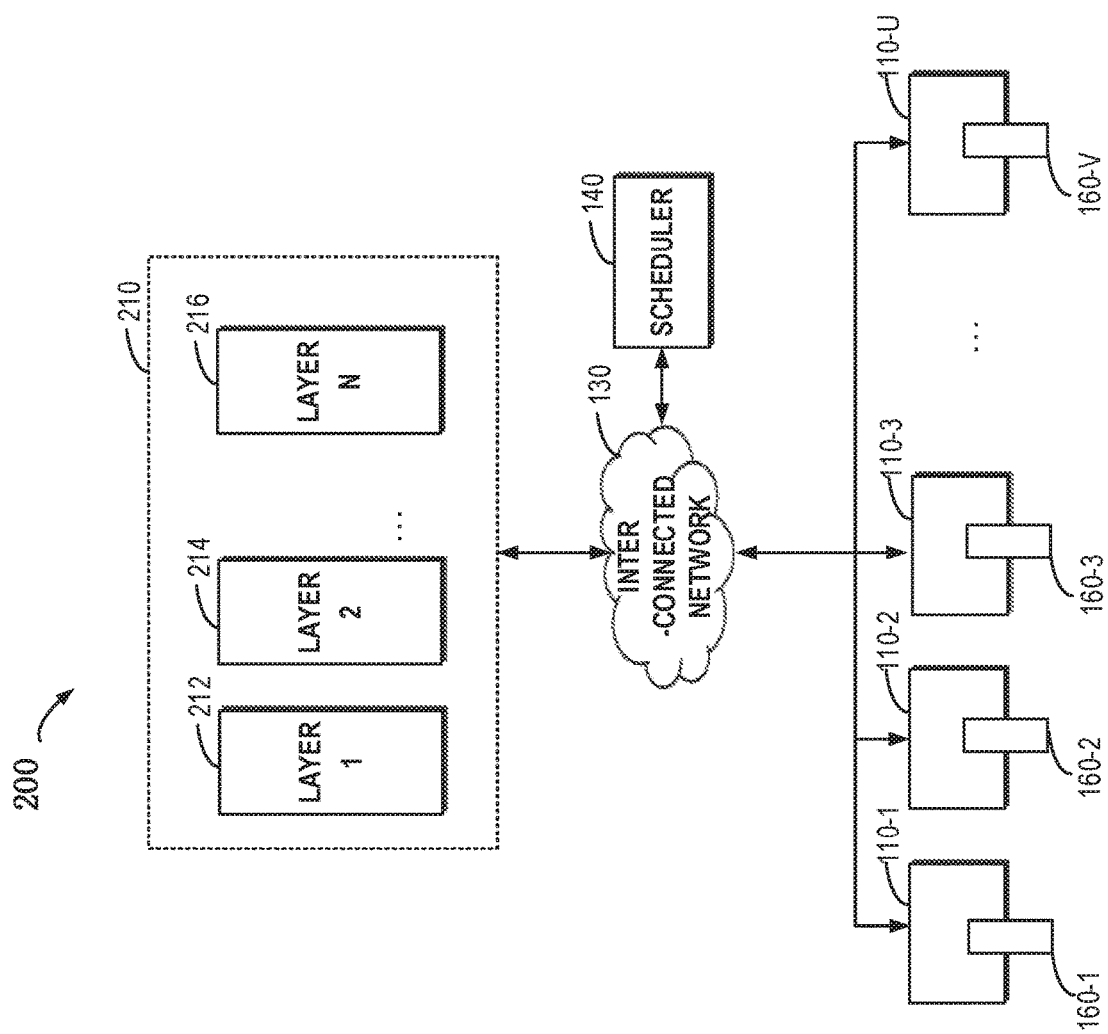
FIG. 2 schematically shows a block diagram of the process for processing a neural network model-based computing task according to one technical solution.

With the development of cloud computing, cloud architecture based technical solutions for processing a computing task have been proposed. For example, the application 120 at the client 150 may request the computing resource 160 in the server 110. It is noteworthy that due to the complexity of a computing task, usually multiple computing resources need to be called. More details of the embodiment of the present disclosure will be described by using a neural network model-based computing task as a specific example. FIG. 2 schematically shows a block diagram 200 of the process for processing a neural network model-based computing task 210 according to one technical solution. As depicted, the computing task 210 may be a computing task based on a neural network model, which neural network may involve multiple layers, e.g., layer 1, layer 2, . . . , layer N denoted by reference numerals 212, 214, . . . , 216 respectively. It will be understood that each layer among layer 1 to layer N will involve a large number of parameters defining the neural network model, e.g. gradient, weight, bias and other parameters. For different layers, the data amounts of parameters being involved will differ significantly, e.g. the number of parameters may range between tens and millions or even larger. Therefore, it is a challenging issue regarding how to process the computing task 210 by multiple computing resources (e.g., the computing resources 160-1 to 160-V) in as much of a balanced way as possible.

It will be understood that technical solutions for processing a neural network model-based computing task have been provided by now. In one technical solution, a set of computing resources with lower workloads may be selected according to the configuration of multiple computing resources. However, this technical solution fails to effectively evaluate the processing performance of the selected set of computing resources.

In another technical solution, it may be determined in the pilot run process which computing resources 160 will be selected for processing the computing task 210. In the pilot run process, one or more computing resources may be selected in multiple rounds by permutation and combination, and the processing performance associated with the selected one or more computing resources may be determined. Subsequently, one or more computing resources associated with the optimal processing performance may be allocated for processing the computing task 210. However, when the resource pool comprises a large number of computing resources, a wide variety of combinations might emerge, so that it is difficult to determine in a short time which computing resources will be selected. In view of the drawbacks in the prior art, the present disclosure proposes a method for processing a computing task.

Figure 3:
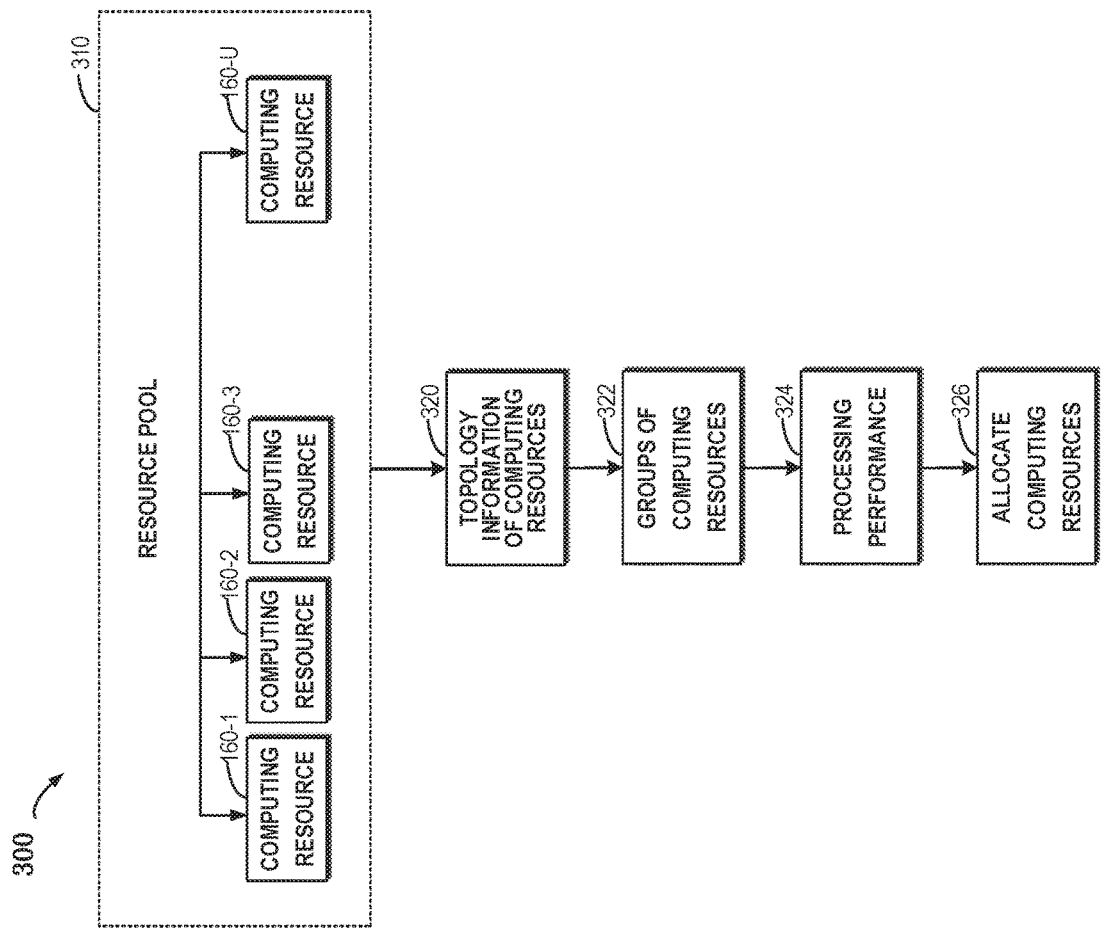
FIG. 3 schematically shows a block diagram for processing a computing task according to example embodiments of the present disclosure.

FIG. 3 schematically shows a block diagram 300 for processing a computing task according to example embodiments of the present disclosure. As depicted, topology information 320 of multiple computing resources 160-1 to 160-V in a resource pool 310 may be obtained. The multiple computing resources 160-1 to 160-V may be divided into multiple groups 322 on the basis of the topology information 320. Subsequently, at least one computing resource may be selected from at least one group of the multiple groups 322, and processing performance 324 associated with the selected at least one computing resource may be determined. Corresponding processing performance 324 may be selected and obtained in multiple rounds. By comparing processing performance 324 associated with each round among the multiple rounds, a computing resource associated with the optimal processing performance may be allocated 326 for processing the computing task 210.

Figure 4:
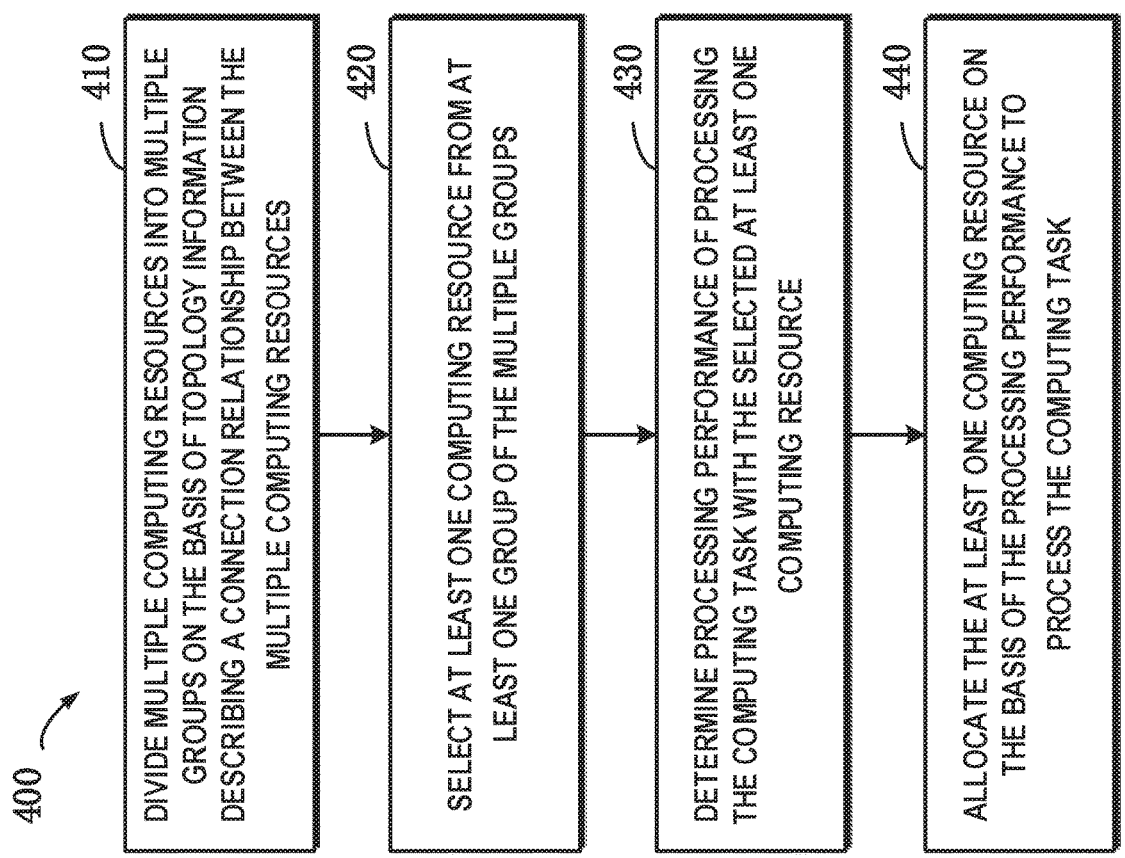
FIG. 4 schematically shows a flowchart of a method for processing a computing task according to example embodiments of the present disclosure.
Figure 5A:
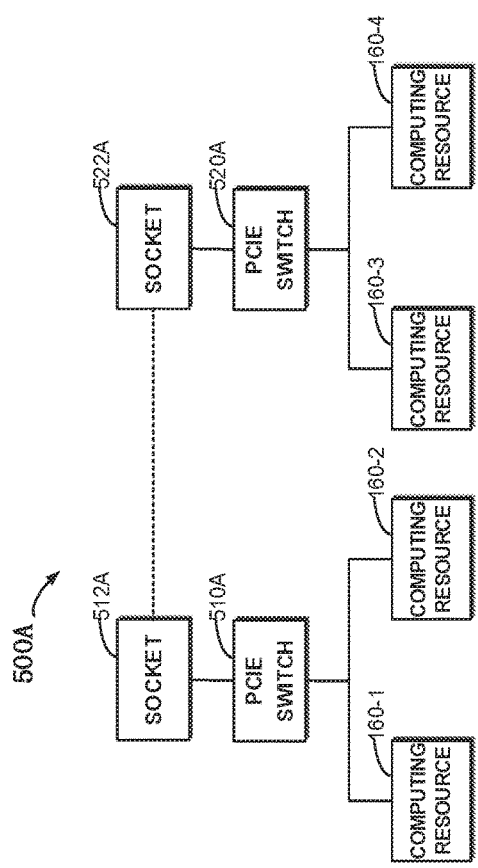
FIG. 5A schematically shows a block diagram of one example topology structure of multiple computing resources according to example embodiments of the present disclosure, and FIG. 5B schematically shows a block diagram of another example topology structure of multiple computing resources according to example embodiments of the present disclosure.
Figure 5B:
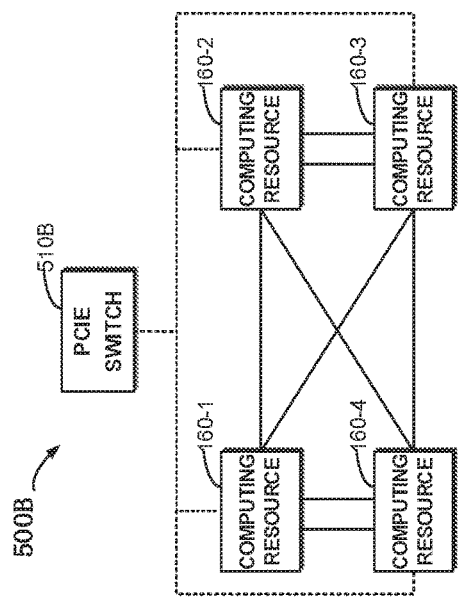

FIG. 4 schematically shows a flowchart of a method 400 for processing the computing task 210 according to example embodiments of the present disclosure. As depicted, at block 410, multiple computing resources 160 may be divided into multiple groups on the basis of topology information describing a connection relationship between the multiple computing resources. It will be understood since the computing resources 160 may contain connections between them, there may exist multiple topology structures. With reference to FIGS. 5A and 5B, two typical topology structures are schematically shown below.

FIG. 5A schematically shows a block diagram 500A of one example topology structure of multiple computing resources according to example embodiments of the present disclosure. As depicted, a PCIe (peripheral component interconnect express) connection is established between the computing resources 160-1 and 160-2 on the basis of a PCIe switch 510A, and a PCIe connection is established between the computing resources 160-3 and 160-4 on the basis of a PCIe switch 520A. A quick path interconnection (QPI) is established between the PCIe switches 510A and 520A on the basis of SOCKETs 512A and 522A.

FIG. 5B schematically shows a block diagram 500B of another example topology structure of multiple computing resources 160 according to example embodiments of the present disclosure. As depicted, take GPU of nVidia as an example. NVlink connections as shown by solid lines are established between the computing resources 160-1, 160-2, 160-3 and 160-4, which support data transmission of 72 GB/s (Giga Bytes per second). Further, the multiple computing resources 160 may further contain PCIe connections as shown by dashed lines which are established via a PCIe switch 510B.

In this embodiment, relevant topology information may be collected from the topology structures as shown in FIGS. 5A and 5B. It will be understood that FIGS. 5A and 5B depict only two example topology structures. In other application environments, more or less computing resources 160 may be comprised, and other connections may further exist between the respective computing resources 160. For example, in one application environment, 8 computing resources may be comprised, among which one group with 4 computing resources is connected as shown in FIG. 5A, and the other group with 4 computing resources is connected as shown in FIG. 5B. The two groups of computing resources are connected by QPI.

Returning to FIG. 4, at block 420, at least one computing resource may be selected from at least one group of the multiple groups. In this embodiment, computing resources may be selected from the multiple groups one by one. For example, in a first stage, one computing resource may be selected from one group. In a second stage, one computing resource may be selected from each of two groups, and so on and so forth. It will be understood that any computing resource may be selected from the multiple computing resources comprised in the multiple groups.

At block 430, processing performance of processing the computing task with the selected at least one computing resource is determined. In this embodiment, an operation associated with the computing task 210 may be deployed at the selected at least one computing resource, and processing performance of executing the operation with the selected at least one computing resource may be tested. At block 440, at least one computing resource is allocated on the basis of the processing performance so as to process the computing task. In this embodiment, preferably, a computing resource associated with higher processing performance may be selected for processing the computing task 210.

With the above example embodiments, by dividing the multiple computing resources 160 into multiple groups, one computing resource may be selected from each group among the multiple groups in the subsequent selecting process, so that the number of possible combinations during selection may be reduced. In this way, the time and other resource overheads in the pilot run process may be reduced significantly, and further the efficiency of processing the computing task 210 may be improved.

Specifically, suppose the resource pool 310 contains 4 computing resources, and the 4 computing resources may be divided into two different groups according to embodiments of the present disclosure, then at this point computing resources are selected from the 2 different groups. According to example embodiments of the present disclosure, the number of combinations is $C_2^1+C_2^2=2+1=3$. Compared with the number of combinations ($C_4^1+C_4^2+C_4^3+C_4^4=4+6+6+1=17$) in the pilot run based on the traditional technical solution, overheads involved in the pilot run according to embodiments of the present disclosure will be greatly reduced. Here, the formula $C_x^y$ represents the number of possible combinations of selecting y elements from x elements.

According to example embodiments of the present disclosure, the topology information describes the type of a combination between the multiple computing resources. In order to divide the multiple computing resources into multiple groups on the basis of the topology information, distances between the multiple computing resources may be determined; and the multiple computing resources may be divided into the multiple groups on the basis of the distances.

While processing the computing task 210, since data needs to be transmitted between the multiple computing resources 160 frequently, the type of a connection between the multiple computing resources becomes a key factor affecting the processing performance for the computing task 210. With the above example embodiments, distances between the various computing resources 160 may be determined on the basis of the type of a connection, and further the multiple computing resources 160 may be divided into different groups easily and effectively. Table 1 schematically shows types of possible connections below.

TABLE 1

Examples of Connection Types

| No. | Connection Type | Annotation | Bandwidth |
|---|---|---|---|
| 1 | NVLink | Interconnection bus between GPUs | Optimal transmission bandwidth, may amount to 36 GB/s |
| 2 | PCIe-S (also called PIX) | A single PCIe switch is used to directly connect two GPUs | Better transmission bandwidth, may amount to 16 GB/s |
| 3 | PCIe-M | Multiple PCIe switches are used to indirectly connect two GPUs | Lower transmission bandwidth than PCIe-S |
| 4 | PCIe-H (also called PHB) | A PCIe host is used to bridge two GPUs | Lower transmission bandwidth than PCIe-M |
| 5 | QPI (also called SOC) | Connection across SOCKET | Worse transmission bandwidth |
| ... | ... | ... | ... |

On the basis of connection types shown in Table 1, the topology information between the multiple computing resources 160 may be represented as shown in Table 2 below. It will be understood that Table 2 shows topology information on the topology structure shown in FIG. 5A, and those skilled in the art may obtain topology information on other topology structures on the basis of the examples in Table 2.

TABLE 2

Example of Topology Information

| | Computing resource 160-1 | Computing resource 160-2 | Computing resource 160-3 | Computing resource 160-4 |
|---|---|---|---|---|
| Computing resource 160-1 | null | PIX | SOC | SOC |
| Computing resource 160-2 | PIX | null | SOC | SOC |
| Computing resource 160-3 | SOC | SOC | null | PIX |
| Computing resource 160-4 | SOC | SOC | PIX | null |

Table 2 shows types of connections between the computing resources 160-1, 160-2, 160-3 and 160-4. It will be understood that the intersection between a row and a column represents the connection type between two correlated computing resources. Specifically, the intersection between the second row and the third column represents the connection type between the computing resources 160-1 and 160-2 is a PIX connection. The intersection between the second row and the second column represents the computing resource 160-1 has no connection with itself, and thus is shown as null.

According to example embodiments of the present disclosure, in order to determine a distance between the multiple computing resources on the basis of the type, a bandwidth of the connection between the multiple computing resources may be determined on the type of the type; and the distance may be determined on the basis of the bandwidth, the distance being inversely proportional to the bandwidth. It will be understood that the higher a bandwidth of the connection between two computing resources 160, the shorter the time for transmitting the same amount of data. Thereby, it may be considered that the bandwidth is an indicator indicative of the distance between two computing resources 160, and the higher the bandwidth, the shorter the distance. With the example embodiments, the distance between the multiple computing resources may be determined quickly and effectively.

For example, a distance between two computing resources 160 with a connection relationship therebetween may be determined on the basis of a bandwidth between the two computing resources 160. If there is a direct connection between the two computing resources 160, then the distance may be determined on the basis of the bandwidth of the direct connection. If there is an indirect connection between the two computing resources 160, then the distance may be determined on the basis of bandwidths of multiple direct connections between the indirect connection.

According to example embodiments of the present disclosure, the connection types may be simply mapped to different distance scores. It will be understood that the distance score schematically represents the scale of a distance between two computing resources, rather than an accurate value of the distance. According to example embodiments of the present disclosure, a distance score associated with each type may be determined using contents shown in Table 3.

TABLE 3

Example of Distance Score

| No. | Connection Type | Distance Score |
|---|---|---|
| 1 | NVLink | 1, if there exist an n number of NVLink connections, then the distance score is 1/n |
| 2 | PCIe-S (also called PIX) | 2 |
| 3 | PCIe-M | 3 |
| 4 | PCIe-H (also called PHB) | 4 |
| 5 | QPI (also called SOC) | 5 |
| ... | ... | ... |

Distances between the multiple computing resources connected according to different topology structures may be determined on the basis of the determined connection types between the multiple computing resources and the mapping between types and distance scores as recorded in Table 3 above. Specifically, Table 4 below shows distances between the multiple computing resources 160 connected according to the topology structure shown in FIG. 5A, and Table 5 below shows distances between the multiple computing resources 160 connected according to the topology structure shown in FIG. 5B.

TABLE 4

Example of Distance Table

| | Computing resource 160-1 | Computing resource 160-2 | Computing resource 160-3 | Computing resource 160-4 |
|---|---|---|---|---|
| Computing resource 160-1 | 0 | 2 | 5 | 5 |
| Computing resource 160-2 | 2 | 0 | 5 | 5 |
| Computing resource 160-3 | 5 | 5 | 0 | 2 |
| Computing resource 160-4 | 5 | 5 | 2 | 0 |

Table 4 shows distance scores between the computing resources 160-1, 160-2, 160-3 and 160-4. It will be understood that the intersection between a row and a column represents the distance score between two correlated computing resources. Specifically, the intersection between the second row and the third column represents the distance score between the computing resources 160-1 and 160-2 is 2. The intersection between the second row and the second column represents the distance score between the computing resource 160-1 and itself is 0.

TABLE 5

Example of Distance Table

| | Computing resource 160-1 | Computing resource 160-2 | Computing resource 160-3 | Computing resource 160-4 |
|---|---|---|---|---|
| Computing resource 160-1 | 0 | 1 | 1 | 0.5 |
| Computing resource 160-2 | 1 | 0 | 0.5 | 1 |
| Computing resource 160-3 | 1 | 0.5 | 0 | 1 |
| Computing resource 160-4 | 0.5 | 1 | 1 | 0 |

Table 5 shows distance scores between the computing resources 160-1, 160-2, 160-3 and 160-4. It will be understood that the intersection between a row and a column represents the distance score between two correlated computing resources. Specifically, the intersection between the second row and the third column represents the distance score between the computing resources 160-1 and 160-2 is 1. The intersection between the second row and the second column represents the distance score between the computing resource 160-1 and itself is 0.

According to example embodiments of the present disclosure, the multiple computing resources 160 may be divided into different groups according to values of the distance scores. FIG. 6A schematically shows a block diagram 600A for dividing multiple computing resources connected according to the topology structure shown in FIG. 5A into different groups according to example embodiments of the present disclosure. As shown in FIG. 6A, according to distance scores 610A between the multiple computing resources 160, the computing resources 160-1 and 160-2 may be assigned to a first group 620A, and the computing resources 160-3 and 160-4 may be assigned to a second group 622A.

According to example embodiments of the present disclosure, the grouping may be implemented in different ways. For example, a graph describing distances between the multiple computing resources may be built on the basis of contents shown in Table 4. In the graph, a node represents a computing resource, and the weight of an edge represents the distance between two computing resources. Subsequently, the grouping may be implemented on the basis of the graph theory, which is not detailed herein.

FIG. 6B schematically shows a block diagram 600B for dividing multiple computing resources connected according to the topology structure shown in FIG. 5B into different groups according to example embodiments of the present disclosure. As shown in FIG. 6B, according to distance scores 610B between the multiple computing resources 160, the computing resources 160-1 and 160-4 may be assigned to a first group 620B, and the computing resources 160-2 and 160-3 may be assigned to a second group 622B.

How to divide the multiple computing resources 160 into different groups has been described with reference to FIGS. 6A and 6B. It will be understood although how to divide 4 computing resources 160 into two different groups has been described above, in other application environments a further number of computing resources 160 may be divided into a further number of groups. For example, 16 computing resources may be divided into 4 different groups.

According to example embodiments of the present disclosure, at least one part of operations are selected from multiple operations associated with the computing task; and the selected at least one part of operations are executed with the selected at least one computing resource so as to obtain the processing performance. With the example embodiments, during pilot run only a part of operations of the computing task need to be executed, and by deployed the part of operations on the selected computing resource to run, the processing performance of deploying all operations of the computing task 210 on the selected computing resource to run may be predicted. For example, suppose the computing task 210 involves one hundred thousand operations, then at this point only 5000 or a further number of operations need to be selected. In this way, the time and overheads in other aspects may be greatly reduced in the pilot run stage.

According to example embodiments of the present disclosure, a measured value of the time for executing the at least one part of operations with the selected at least one computing resource or the number of operations to be executed per unit time may be determined. For example, continuing the above example, the time for running 5000 selected operations may be measured, or the number of operations processed per second may be measured while running 5000 selected operations. Subsequently, the processing performance may be determined on the basis of the measured value. It will be understood that the shorter the running time, the higher the processing performance, and the larger the number of operations executed per unit time, the higher the processing performance. With the above example embodiments, the processing performance associated with the selected computing resource may be determined quantitatively, and further whether the processing performance is high or low may be measured more accurately and effectively.

According to example embodiments of the present disclosure, a first set of computing resources and a second set of computing resources may be selected from different numbers of groups in different stages. For example, a first set of computing resources may be selected from a first number of first groups, and a second set of computing resources may be selected from a second number of second groups. In order to allocate the at least one computing resource on the basis of the processing performance to process the computing task, the second set of computing resources is allocated to process the computing task if first processing performance of processing the computing task with the first set of computing resources is not above second processing performance of processing the computing task with the second set of computing resources.

According to example embodiments of the present disclosure, selecting the at least one computing resource from at least one group of the multiple groups may comprise multiple stages. For example, in a first stage, one computing resource may be selected from one group of the multiple groups. Suppose the multiple computing resources 160 have been divided into 4 groups, then in the first stage, one computing resource may be selected from a first group among the 4 groups, and relevant processing performance 1-1 may be determined. Subsequently, one computing resource may be selected from a second, third and fourth group respectively, and relevant processing performance 1-2, 1-3 and 1-4 may be determined. By comparing values of the performance 1-1, 1-2, 1-3 and 1-4, a computing resource associated with the optimal processing performance may be allocated to process the computing task 210.

According to example embodiments of the present disclosure, after completion of the first stage, the number of selected computing resources 160 may be gradually increased in the subsequent pilot run. Continuing the above example, in a second stage, one computing resource may be selected from 2 of the 4 groups respectively, and relevant processing performance may be determined. Next, by comparing values of the determined multiple processing performance, computing resources associated with the optimal processing performance may be allocated to process the computing task 210. With the above example embodiments, the number of computing resources for processing the computing task 210 may be continuously increased, and further it is ensured that combinations of the selected at least one computing resource can represent various typical combinations.

It will be understood the larger the number of selected computing resources 160, the more overhead for data transmission between selected computing resources 160. Therefore, with the increase of the number, the processing performance might be reduced. In other words, the processing performance associated with more computing resources might possibly be below the processing performance associated with less computing resources.

According to example embodiments of the present disclosure, a third computing resource is selected from a third group among the multiple groups if processing performance of processing the computing task with the first computing resource and the second computing resource is not below processing performance of processing the computing task with the first computing resource. With the above example embodiments, when the processing performance associated with a subsequent stage is found to decrease, it is considered that the optimal processing performance has been found, and hence the selecting process stops.

Continuing the above example, suppose the processing performance associated with 2 computing resources is below the processing performance associated with 1 computing resource, then at this point the selecting process ends. Suppose the processing performance associated with 2 computing resources is above the processing performance associated with 1 computing resource, then a third stage of selection may start. Specifically, in the third stage, one computing resource may be selected from 3 of 4 groups respectively, and relevant processing performance may be determined. Next, by comparing values of the determined multiple processing performance, a computing resource associated with the optimal processing performance may be allocated to process the computing task 210. Suppose the processing performance associated with 3 computing resources is below the processing performance associated with 2 computing resources, then at this point the selecting process ends. In this embodiment, the processing performance associated with 2 computing resources 160 is the optimal processing performance, so combinations of computing resources for processing the computing task 210 may be determined on the basis of computing resources that result in the optimal processing performance.

Figure 7A:
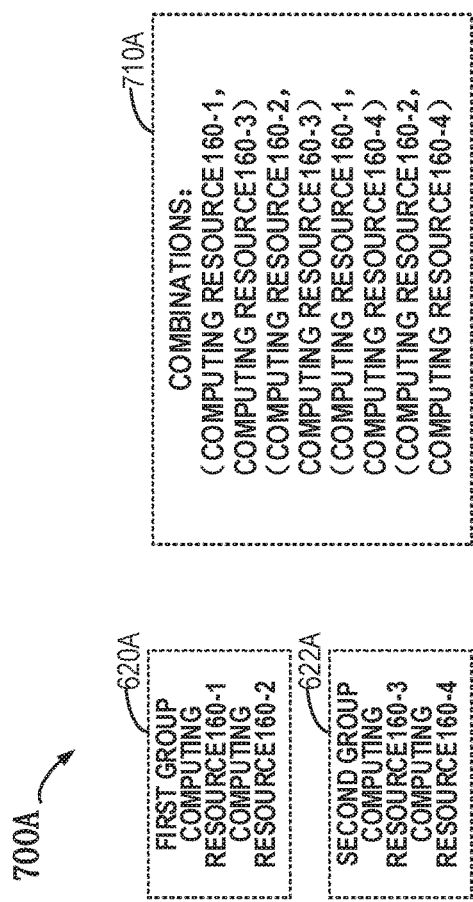
FIG. 7A schematically shows a block diagram for allocating multiple computing resources connected according to the topology structure shown in FIG. 5A into different groups according to example embodiments of the present disclosure, and FIG. 7B schematically shows a block diagram for allocating multiple computing resources connected according to the topology structure shown in FIG. 5B into different groups according to example embodiments of the present disclosure.
Figure 7B:
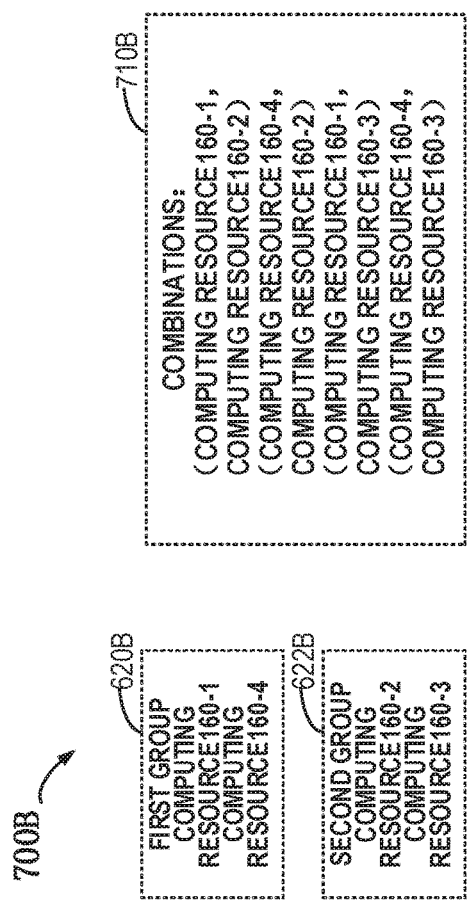

With reference to FIGS. 7A and 7B, description is presented below on how to determine combinations of computing resources for processing the computing task 210. According to the above described rule for determining the processing performance, suppose the processing performance associated with two computing resources is determined to be optimal, then one computing resource may be selected from each of the two computing resources. FIG. 7A schematically shows a block diagram 700A for allocating multiple computing resources connected according to the topology structure shown in FIG. 5A according to example embodiments of the present disclosure. As shown in FIG. 7A, one computing resource may be selected from the first group 620A and the second group 622A respectively, so 4 combinations may be generated as shown in combinations 710A:

(computing resource 160-1, computing resource 160-3)
(computing resource 160-2, computing resource 160-3)
(computing resource 160-1, computing resource 160-4)
(computing resource 160-2, computing resource 160-4)

FIG. 7B schematically shows a block diagram 700B for allocating multiple computing resources connected according to the topology structure shown in FIG. 5B according to example embodiments of the present disclosure. As shown in FIG. 7B, one computing resource may be selected from the first group 620B and the second group 622B respectively, so 4 combinations may be generated as shown in combinations 710B:

(computing resource 160-1, computing resource 160-2)
(computing resource 160-4, computing resource 160-2)
(computing resource 160-1, computing resource 160-3)
(computing resource 160-4, computing resource 160-3)

According to example embodiments of the present disclosure, the multiple computing resources are multiple graphics processing units. It will be understood although in the context of the present disclosure multiple example embodiments of the present disclosure are described by taking graphics processing units as an example, in other application environments the computing resources may further comprise, but are not limited to, field programmable gate arrays and other computing resources. According to example embodiments of the present disclosure, the computing task is a neural network model-based computing task. After it is determined which computing resources 160 will be used to process the computing task 210, operations associated with the computing task 210 may be deployed to determined computing resources 160.

Figure 8:
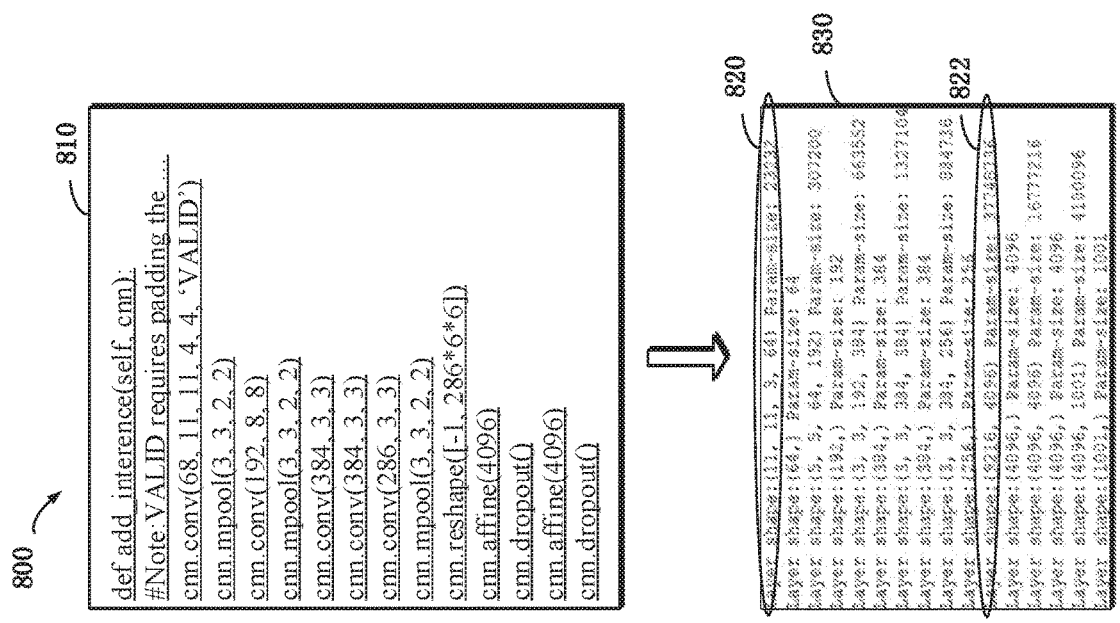
FIG. 8 schematically shows a block diagram for obtaining parameter data associated with a neural network according to example embodiments of the present disclosure.

FIG. 8 schematically shows a block diagram 800 for obtaining parameter data associated with a neural network according to example embodiments of the present disclosure. As depicted, a reference numeral 810 schematically shows configuration information of a neural network model according to example embodiments. Here the configuration information 810 defines multiple layers comprised in the neural network model and parameters involved in each layer. Parameter data 830 associated with the neural network model may be obtained by parsing the configuration information 810.

As shown in FIG. 8, the parameter data 830 are a concrete example of parameter data according to example embodiments of the present disclosure. As shown by the parameter data 830, the neural network model may comprise multiple layers, and a field "Param-size" in each row defines the number of parameters associated with each layer. As shown in a row 820 of the parameter data 830, one layer may comprise 23232 parameters; as shown in a row 822 of the parameter data 830, one layer may comprise 37748736 parameters, etc. It will be understood that how to obtain the parameter data 830 is not limited in the context of the present disclosure. Instead, those skilled in the art may obtain the parameter data 830 according to various technical solutions that have been developed or will be developed in future in the prior art.

According to example embodiments of the present disclosure, first statistics may be determined on the number of parameters involved in each layer, so that a computing resource may first be allocated for a layer with a larger number of parameters. For example, based on the parameter data 830 as shown in FIG. 8, corresponding numbers of parameters associated with at least one part of layers may be determined. In this example, by extracting values in the field Param-size in the parameter data 830, the number of parameters associated with each layer may be represented as: [23232, 64, 307200, 192, 663552, 384, 1327104, 384, 884736, 256, 37748736, 4096, 16777216, 4096, 4100096, 1001]. In this example, determined parameters associated with the neural network model may be deployed on allocated computing resources 160 respectively.

As examples of the method according to the present disclosure have been described in detail with reference to FIGS. 2 to 8, the method may be implemented in an apparatus. According to example embodiments of the present disclosure, provided is an apparatus for processing a computing task. The apparatus comprises: a dividing module configured to divide multiple computing resources into multiple groups on the basis of topology information describing a connection relationship between the multiple computing resources; a selecting module configured to select at least one computing resource from at least one group of the multiple groups; a determining module configured to determine processing performance of processing the computing task with the selected at least one computing resource; and an allocating module configured to allocate the at least one computing resource on the basis of the processing performance to process the computing task.

Figure 9:
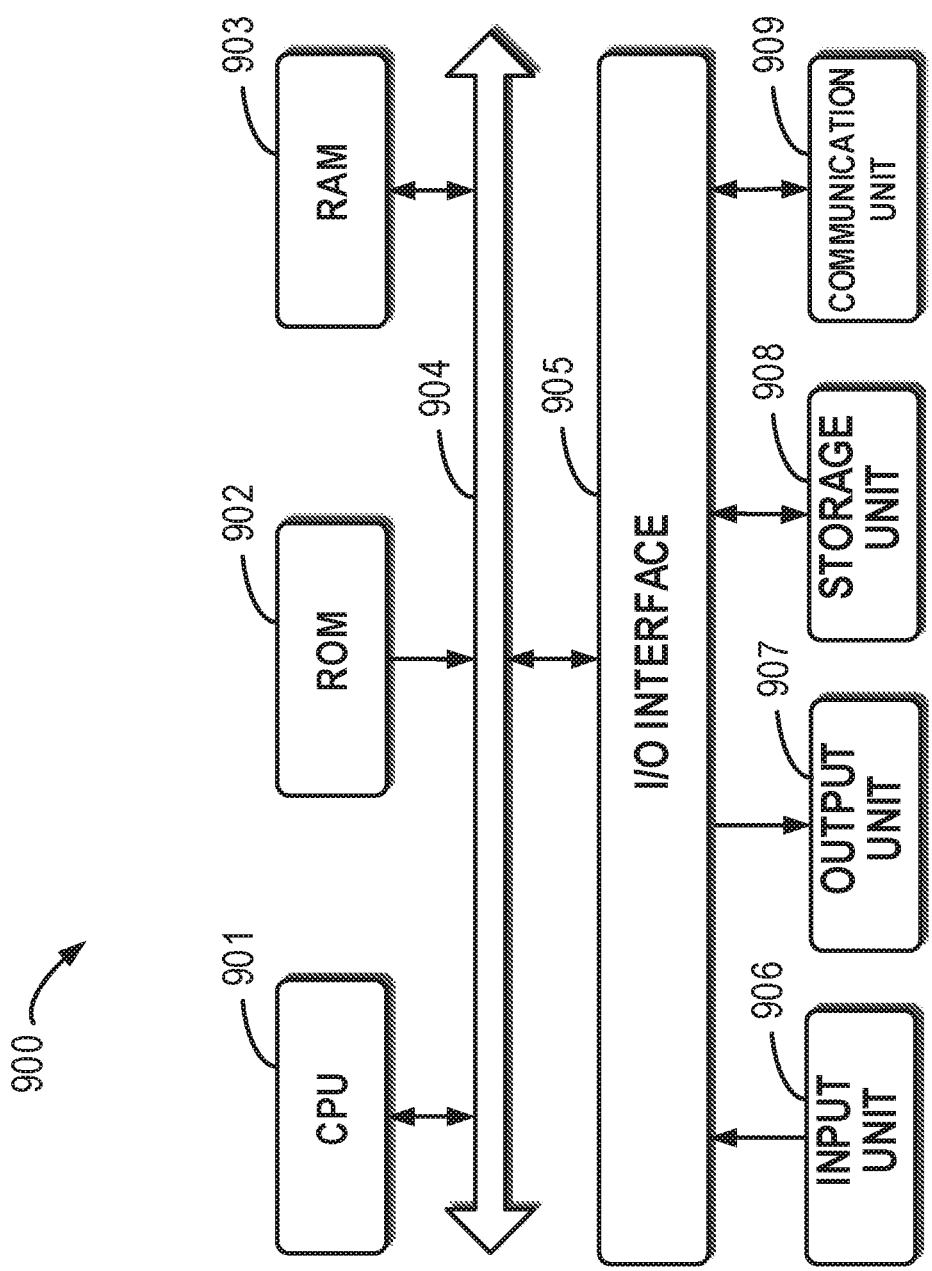
FIG. 9 schematically shows a block diagram of an apparatus for processing a computing task according to example embodiments of the present disclosure.

FIG. 9 schematically shows a block diagram of an apparatus 900 for processing a computing task according to example embodiments of the present disclosure. As depicted, the apparatus 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904.

A plurality of components in the apparatus 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the apparatus 900 to exchange information/data with other devices via the computer network, such as Internet, and/or various telecommunication networks.

The above described each procedure and processing, such as the method 400, can also be executed by the processing unit 901. For example, in some embodiments, the method 400 can be implemented as a computer software program tangibly included in the machine-readable medium, e.g., the storage unit 908. In some embodiments, the computer program can be partially or fully loaded and/or mounted to the apparatus 900 via ROM 902 and/or the communication unit 909. When the computer program is loaded to the RAM 903 and executed by the CPU 901, one or more steps of the above described method 400 can be implemented. Alternatively, in other embodiments, the CPU 901 also can be configured in other suitable manners to realize the above procedure/method.

According to example embodiments of the present disclosure, there is provided an apparatus for processing a computing task, comprising: at least one processor; a volatile memory; and a memory coupled to the at least one processor, the memory having instructions stored thereon, the instructions, when executed by the at least one processor, causing the apparatus to perform acts. The acts include: dividing multiple computing resources into multiple groups on the basis of topology information describing a connection relationship between the multiple computing resources; selecting at least one computing resource from at least one group of the multiple groups; determining processing performance of processing the computing task with the selected at least one computing resource; and allocating the at least one computing resource on the basis of the processing performance to process the computing task.

According to example embodiments of the present disclosure, the topology information describes a type of a combination between the multiple computing resources, and dividing the multiple computing resources into multiple groups on the basis of the topology information comprises: determining distances between the multiple computing resources on the basis of the type; and dividing the multiple computing resources into the multiple groups on the basis of the distances, a distance from a first computing resource comprised in a first group among the multiple groups to a further resource in the first group being below a distance from the first computing resource to a further resource in a second group among the multiple groups.

According to example embodiments of the present disclosure, determining distances between the multiple computing resources on the basis of the type comprises: determining a bandwidth of the connection between the multiple computing resources on the basis of the type; and determining the distance on the basis of the bandwidth, the distance being inversely proportional to the bandwidth.

According to example embodiments of the present disclosure, selecting at least one computing resource from at least one group among the multiple groups comprises: selecting a first computing resource from a first group among the multiple groups.

According to example embodiments of the present disclosure, selecting at least one computing resource from at least one group among the multiple groups further comprises: selecting a second computing resource from a second group among the multiple groups.

According to example embodiments of the present disclosure, selecting at least one computing resource from at least one group among the multiple groups further comprises: selecting a third computing resource from a third group among the multiple groups in response to processing performance of processing the computing task with the first computing resource and the second computing resource not being below processing performance of processing the computing task with the first computing resource.

According to example embodiments of the present disclosure, determining processing performance of processing the computing task with the selected at least one computing resource comprises: selecting at least one part of operations from multiple operations associated with the computing task; and executing the selected at least one part of operations with the selected at least one computing resource so as to obtain the processing performance.

According to example embodiments of the present disclosure, obtaining the processing performance comprises: determining a measured value of the time for executing the at least one part of operations with the selected at least one computing resource or the number of operations executed per unit time; and determining the processing performance on the basis of the measured value.

According to example embodiments of the present disclosure, selecting at least one computing resource from at least one group of the multiple groups comprises: selecting a first set of computing resources from a first number of first groups, and selecting a second set of computing resources from a second number of second groups; and allocating the at least one computing resource on the basis of the processing performance to process the computing task comprises: allocating the second set of computing resources to process the computing task in response to first processing performance of processing the computing task with the first set of computing resources not being above second processing performance of processing the computing task with the second set of computing resources.

According to example embodiments of the present disclosure, the multiple computing resources are multiple graphics processing units, and the computing task is a neural network model-based computing task.

According to example embodiments of the present disclosure, there is provided a computer program product. The computer program product is tangibly stored on a computer readable medium and comprises machine executable instructions which, when executed, cause the machine to implement the method according to the present disclosure.

According to example embodiments of the present disclosure, there is provided a computer readable medium. The computer readable medium is stored with machine executable instructions thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, micro-codes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple embodiments of the present disclosure. In this regard, each block in the flow chart or block diagram can represent a module, a part of program segment or code, wherein the module and the part of program segment or code include one or more executable instructions for performing stipulated logic functions. In some alternative embodiments, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are contemplated. The selection of terms in the text aims to best explain principles and actual applications of each embodiment and technical improvements made in the market by each embodiment, or enable other ordinary skilled in the art to understand embodiments of the present disclosure.

What is claimed is:

1. A method for processing a computing task, comprising:
obtaining topology information describing a connection relationship between multiple computing resources, the connection relationship being based in part on a type of connection and a transmission bandwidth, the transmission bandwidth being an indicator of a distance between at least two computing resources of the multiple computing resources, the type of connection including one of a direct connection and an indirect connection between the at least two computing resources, and the type of connection being associated with the transmission bandwidth;
determining the transmission bandwidths between the multiple computing resources based on the type of connection;
determining the distances between the multiple computing resources on the basis of the transmission bandwidths;
dividing the multiple computing resources into a first set of groups on the basis of the distances, the first set of groups comprising a first group comprises a plurality of computing resources and a second group comprising a plurality of computing resources;

selecting a first set of computing resources from the first group of the first set of groups, and selecting a second set of computing resources from the second group of the first set of groups to generate a second set of groups;

wherein each group in the second set of groups comprises one of the computer resources from the first set of computing resources and one of the computer resources from the second set of computing resources, wherein a total number of groups in the second set of groups are the number of combinations of each of the one of the computer resources from the first set of computing resources with each of the one of the computer resources from the second set of computing resources;

determining a processing performance associated with processing the computing task with each group in the second set of groups;

allocating one group of the total number of groups of the second set of groups to process the computing task in response to the processing performance of processing the computing task with one group of the total number of groups of the second set of groups being above the processing performance of processing the computing task with other groups of the total number of groups of the second set of groups; and processing the computing task in the one group of the total number of groups of the second set of groups.

2. The method of claim 1, wherein the topology information describes a type of a combination between the multiple computing resources, and dividing the multiple computing resources into the first set of groups on the basis of the distances comprises:

determining the distances between the multiple computing resources on the basis of the type of connection; and dividing the multiple computing resources into the first set of groups on the basis of the distances, a distance from a first computing resource comprised in the first group among the first set of groups to a further computer resource in the first group being below a distance from the first computing resource to a further computer resource in the second group among the first set of groups.

3. The method of claim 2, wherein determining the distances between the multiple computing resources on the basis of the type of connection comprises:

determining a bandwidth of the connection between the multiple computing resources on the basis of the type of connection; and determining the distance on the basis of the bandwidth, the distance being inversely proportional to the bandwidth;

wherein responsive to a direct connection between two respective computing resources of the multiple computing resources, determining the distance based on the bandwidth of the direct connection; and responsive to an indirect connection between two respective computing resources of the multiple computing resources, determining the distance based on the respective bandwidths of multiple direct connections comprising the indirect connection.

4. The method of claim 1, wherein selecting a first set of computing resources from the first group of the first set of groups comprises:

selecting a first computing resource from the first group of the first set of groups.

5. The method of claim 4, wherein selecting a second set of computing resources from the second group of the first set of groups further comprises:

selecting a second computing resource from the second group of the first set of groups.

6. The method of claim 5, wherein selecting at least one computing resource from at least one other group among the first set of groups further comprises:

selecting a third computing resource from a third group among the first set of groups in response to processing performance of processing the computing task with the first computing resource and the second computing resource not being below processing performance of processing the computing task with the first computing resource.

7. The method of claim 1, wherein determining processing performance associated with processing the computing task with each group in the second set of groups comprises:

selecting at least one part of operations from multiple operations associated with the computing task; and executing the selected at least one part of operations with each group in the second set of groups so as to obtain the processing performance.

8. The method of claim 7, wherein determining the processing performance comprises:

determining a measured value of a time for executing the at least one part of operations with each group in the second set of groups or a number of operations executed per unit time; and determining the processing performance on the basis of the measured value.

9. The method of claim 1, wherein the multiple computing resources are multiple graphics processing units, and the computing task is a neural network model-based computing task.

10. An apparatus for processing a computing task, comprising:

at least one processor;

a volatile memory; and a memory coupled to the at least one processor and having instructions stored thereon, the instructions, when executed by the at least one processor, causing the apparatus to perform acts comprising:

obtaining topology information describing a connection relationship between multiple computing resources, the connection relationship being based in part on a type of connection and a transmission bandwidth, the transmission bandwidth being an indicator of a distance between at least two computing resources of the multiple computing resources, the type of connection including one of a direct connection and an indirect connection between the at least two computing resources, and the type of connection being associated with the transmission bandwidth;

determining the transmission bandwidths between the multiple computing resources based on the type of connection;

determining the distances between the multiple computing resources on the basis of the transmission bandwidths;

dividing the multiple computing resources into a first set of groups on the basis of the distances, the first set of groups comprising a first group comprising a plurality of computing resources and a second group comprising a plurality of computing resources;

selecting a first set of computing resources from the first group of the first set of groups, and selecting a second set of computing resources from the second group of the first set of groups to generate a second set of groups;

wherein each group in the second set of groups comprises one of the computer resources from the first set of computing resources and one of the computer resources from the second set of computing resources, wherein a total number of groups in the second set of groups are the number of combinations of each of the one of the computer resources from the first set of computing resources with each of the one of the computer resources from the second set of computing resources;

determining a processing performance associated with processing the computing task with each group in the second set of groups;

allocating one group of the total number of groups of the second set of groups to process the computing task in response to the processing performance of processing the computing task with one group of the total number of groups of the second set of groups being above the processing performance of processing the computing task with other groups of the total number of groups of the second set of groups; and processing the computing task in the one group of the total number of groups of the second set of groups.

11. The apparatus of claim 10, wherein the topology information describes a type of a combination between the multiple computing resources, and dividing the multiple computing resources into the first set of groups on the basis of the distances comprises:

determining the distances between the multiple computing resources on the basis of the type of connection; and dividing the multiple computing resources into the first set of groups on the basis of the distances, a distance from a first computing resource comprised in the first group among the first set of groups to a further computer resource in the first group being below a distance from the first computing resource to a further computer resource in the second group among the first set of groups.

12. The apparatus of claim 11, wherein determining the distances between the multiple computing resources on the basis of the type of connection comprises:

determining a bandwidth of the connection between the multiple computing resources on the basis of the type of connection; and determining the distance on the basis of the bandwidth, the distance being inversely proportional to the bandwidth;

wherein responsive to a direct connection between two respective computing resources of the multiple computing resources, determining the distance based on the bandwidth of the direct connection; and responsive to an indirect connection between two respective computing resources of the multiple computing resources, determining the distance based on the respective bandwidths of multiple direct connections comprising the indirect connection.

13. The apparatus of claim 10, wherein selecting a first set of computing resources from the first group of the first set of groups comprises:

selecting a first computing resource from the first group of the first set of groups.

14. The apparatus of claim 13, wherein selecting a second set of computing resources from the second group of the first set of groups further comprises:

selecting a second computing resource from the second group of the first set of groups.

15. The apparatus of claim 14, wherein selecting at least one computing resource from at least one other group among the first set of groups further comprises:

selecting a third computing resource from a third group among the first set of groups in response to processing performance of processing the computing task with the first computing resource and the second computing resource not being below processing performance of processing the computing task with the first computing resource.

16. The apparatus of claim 10, wherein determining processing performance associated with processing the computing task with each group in the second set of groups comprises:

selecting at least one part of operations from multiple operations associated with the computing task; and executing the selected at least one part of operations with each group in the second set of groups so as to obtain the processing performance.

17. The apparatus of claim 16, wherein determining the processing performance comprises:

determining a measured value of a time for executing the at least one part of operations with each group in the second set of groups or a number of operations executed per unit time; and determining the processing performance on the basis of the measured value.

18. A computer program product, tangibly stored on a non-transitory computer readable medium and comprising machine executable instructions which, when executed, cause a machine to implement a method for processing a computing task, comprising:

obtaining topology information describing a connection relationship between multiple computing resources, the connection relationship being based in part on a type of connection and a transmission bandwidth, the transmission bandwidth being an indicator of a distance between at least two computing resources of the multiple computing resources, the type of connection including one of a direct connection and an indirect connection between the at least two computing resources, and the type of connection being associated with the transmission bandwidth;

determining the transmission bandwidths between the multiple computing resources based on the type of connection;

determining the distances between the multiple computing resources on the basis of the transmission bandwidths;

dividing the multiple computing resources into a first set of groups on the basis of the distances, the first set of groups comprising a first group comprising a plurality of computing resources and a second group comprising a plurality of computing resources;

selecting a first set of computing resources from the first group of the first set of groups, and selecting a second set of computing resources from the second group of the first set of groups to generate a second set of groups;

wherein each group in the second set of groups comprises a one of the computer resources from the first set of computing resources and one of the computer resources from the second set of computing resources, wherein a total number of groups in the second set of groups are the number of combinations of each of the one of the computer resources from the first set of computing resources with each of the one of the computer resources from the second set of computing resources;

determining a processing performance associated with processing the computing task with each group in the second set of groups;

allocating one group of the total number of groups of the second set of groups to process the computing task in response to the processing performance of processing the computing task with one group of the total number of groups of the second set of groups being above the processing performance of processing the computing task with other groups of the total number of groups of the second set of groups; and processing the computing task in the one group of the total number of groups of the second set of groups.

19. The computer program product of claim 18, wherein the topology information describes a type of a combination between the multiple computing resources, and dividing the multiple computing resources into the first multiple groups on the basis of the distances comprises:

determining the distances between the multiple computing resources on the basis of the type of connection; and dividing the multiple computing resources into the first set of groups on the basis of the distances, a distance from a first computing resource comprised in the first group among the first set of groups to a further computer resource in the first group being below a distance from the first computing resource to a further computer resource in the second group among the first set of groups.

20. The computer program product of claim 19, wherein determining the distances between the multiple computing resources on the basis of the type of connection comprises:

determining a bandwidth of the connection between the multiple computing resources on the basis of the type of connection; and determining the distance on the basis of the bandwidth, the distance being inversely proportional to the bandwidth;

wherein responsive to a direct connection between two respective computing resources of the multiple computing resources, determining the distance based on the bandwidth of the direct connection; and responsive to an indirect connection between two respective computing resources of the multiple computing resources, determining the distance based on the respective bandwidths of multiple direct connections comprising the indirect connection.

* * * * *